H. A. HOUSEMAN.
CIRCULAR KNITTING MACHINE.
APPLICATION FILED FEB. 19, 1916.

1,206,848.

Patented Dec. 5, 1916.
6 SHEETS—SHEET 2.

WITNESS:
Rob R Kitchel

INVENTOR
Harry A. Houseman
BY
Frank S. Busser
ATTORNEY

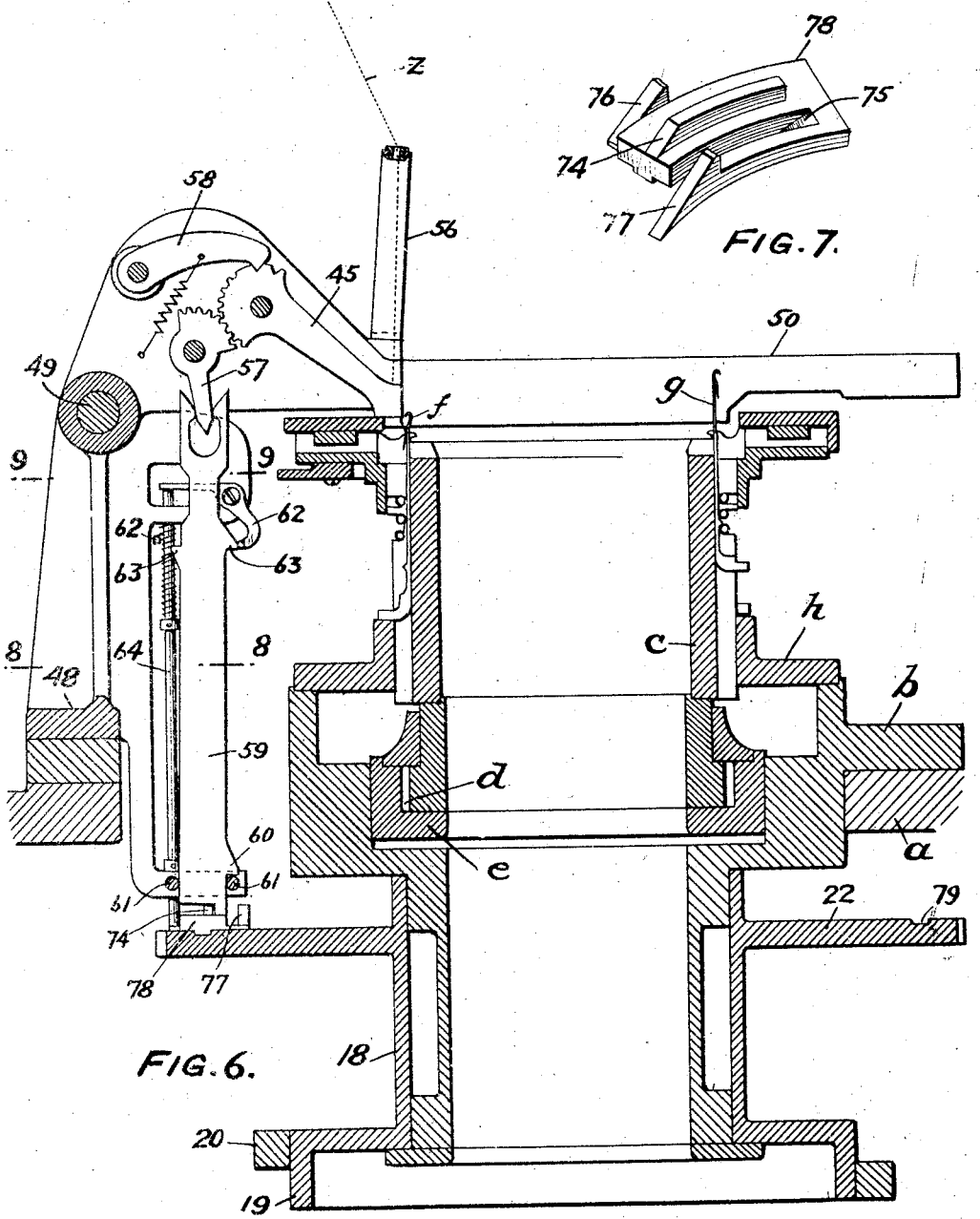

H. A. HOUSEMAN.
CIRCULAR KNITTING MACHINE.
APPLICATION FILED FEB. 19, 1916.

1,206,848.

Patented Dec. 5, 1916.
6 SHEETS—SHEET 6.

WITNESS:

INVENTOR
Harry A. Houseman
BY Frank D. Busser
ATTORNEY

UNITED STATES PATENT OFFICE.

HARRY A. HOUSEMAN, OF PHILADELPHIA, PENNSYLVANIA, ASSIGNOR TO STANDARD MACHINE COMPANY, OF PHILADELPHIA, PENNSYLVANIA, A CORPORATION OF PENNSYLVANIA.

CIRCULAR-KNITTING MACHINE.

1,206,848.     Specification of Letters Patent.     Patented Dec. 5, 1916.

Original application filed September 22, 1915, Serial No. 51,939. Divided and this application filed February 19, 1916. Serial No. 79,240.

*To all whom it may concern:*

Be it known that I, HARRY A. HOUSEMAN, a citizen of the United States, residing at Philadelphia, county of Philadelphia, and State of Pennsylvania, have invented a new and useful Improvement in Circular-Knitting Machines, of which the following is a full, clear, and exact description, reference being had to the accompanying drawings, which form a part of this specification.

In an application filed by me September 22, 1915, Serial No. 51,939, I have set forth a knitting machine embodying a number of novel features and adapted to automatically knit a full fashioned stocking throughout. Said knitting machine is of the type wherein the needle cylinder rotates and the cam plate and yarn carriers are stationary. Included in the mechanism of said machine are yarn carriers, both regular and auxiliary, with means for actuating them in the proper sequence and at the proper time relatively to the operation of other correlated parts.

The subject matter of the present invention is divided out of the above application and relates particularly to the yarn carriers and their actuating mechanism, and has for its object to improve their construction and more especially the construction of their actuating mechanism and of the mechanism for operating the coöperating cutter and clamp.

To fully understand the invention, it is necessary to describe the general construction of the machine and also certain mechanism whose operation is more or less closely related to that of the yarn carriers. It will be understood, therefore, that the drawings and description herein include not only the subject matter claimed herein but also certain other subject matter covered by the claims in the original application above mentioned.

Figure 1:
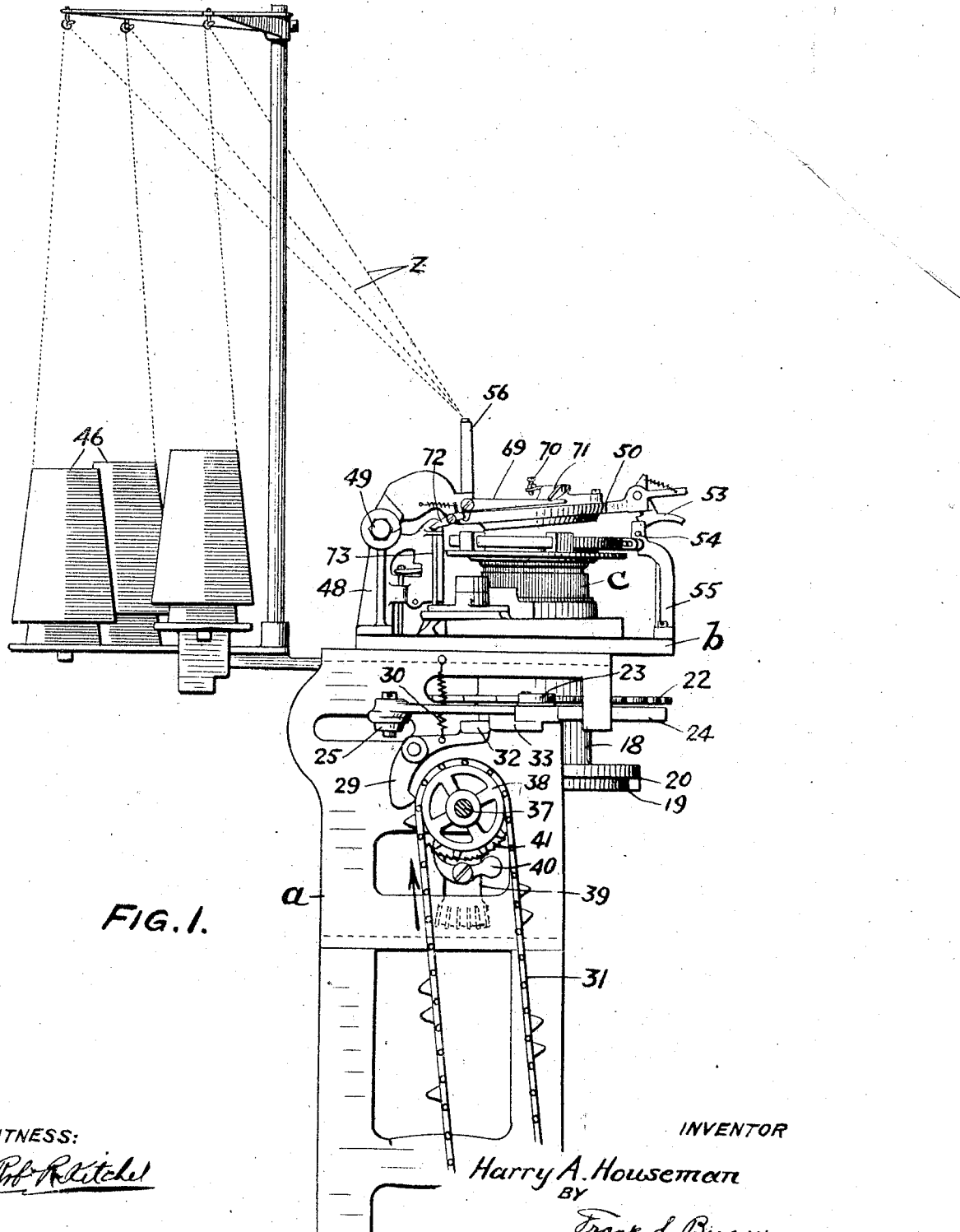
Figure 2:
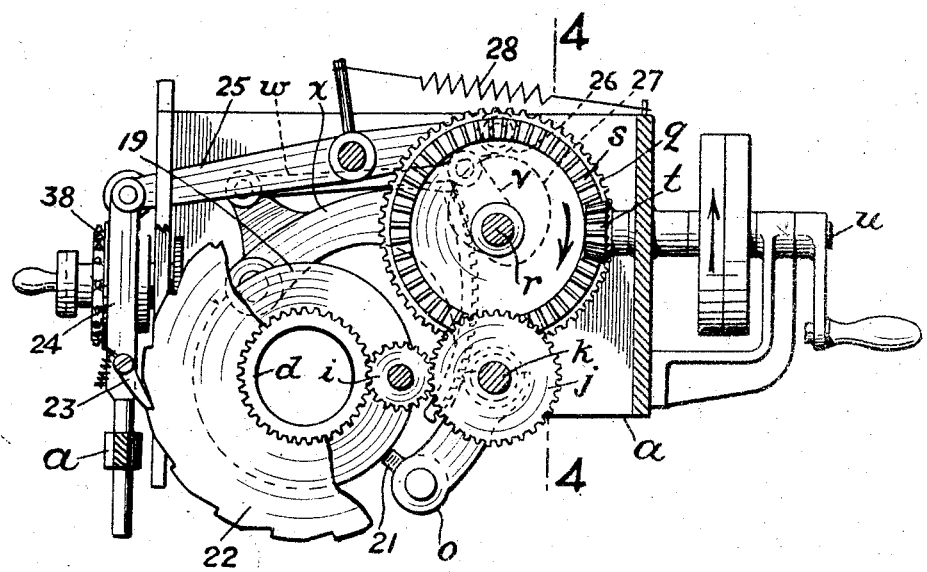
Figure 3:
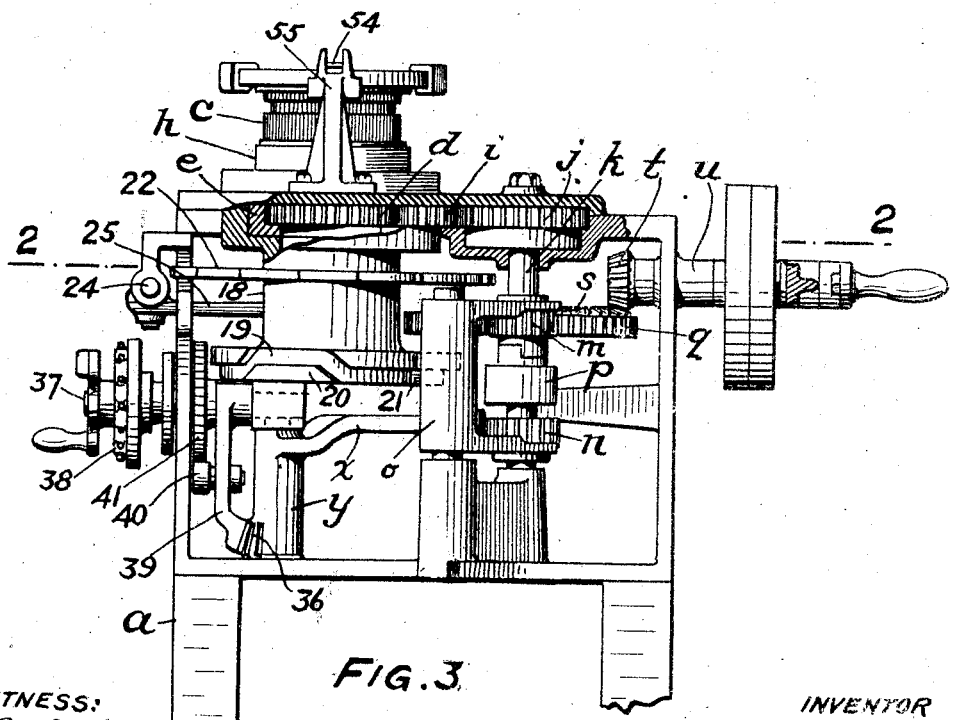
Figure 5:
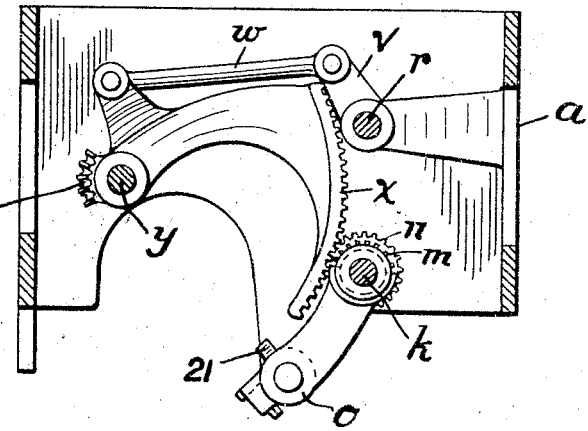
Figure 4:
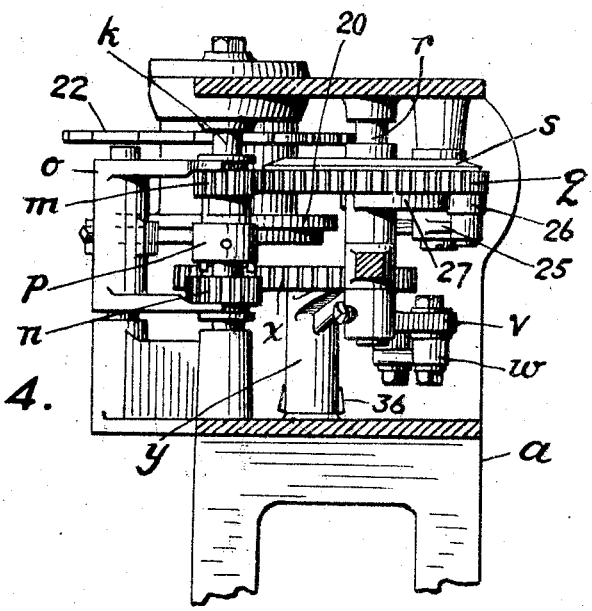
Figure 8:
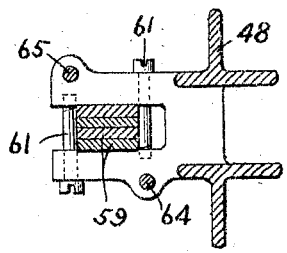
Figure 9:
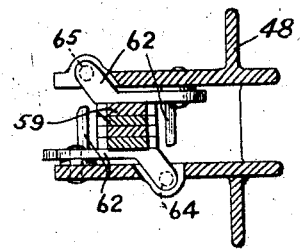
Figure 10:
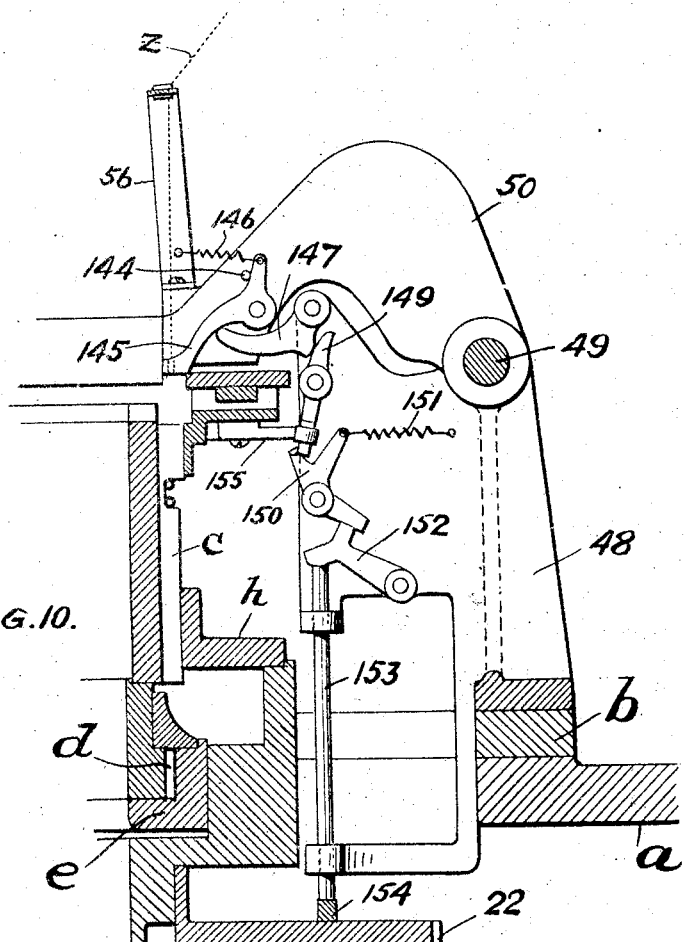
Figure 11:
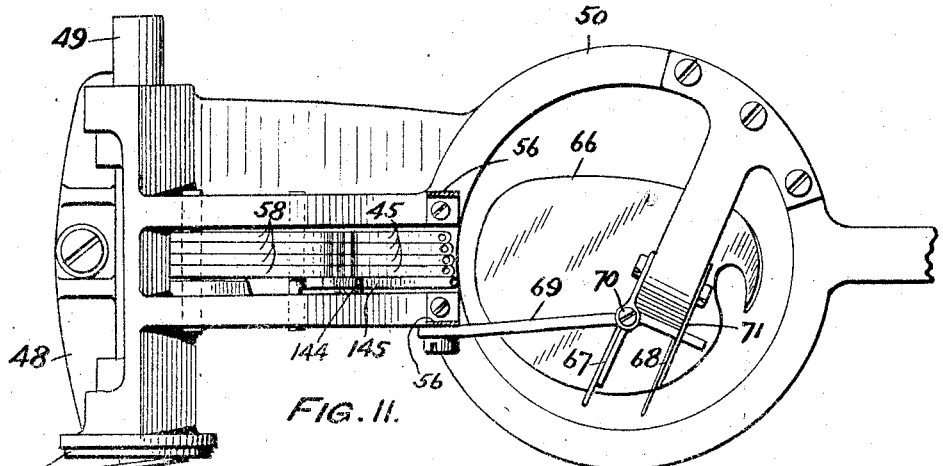
Figure 12:
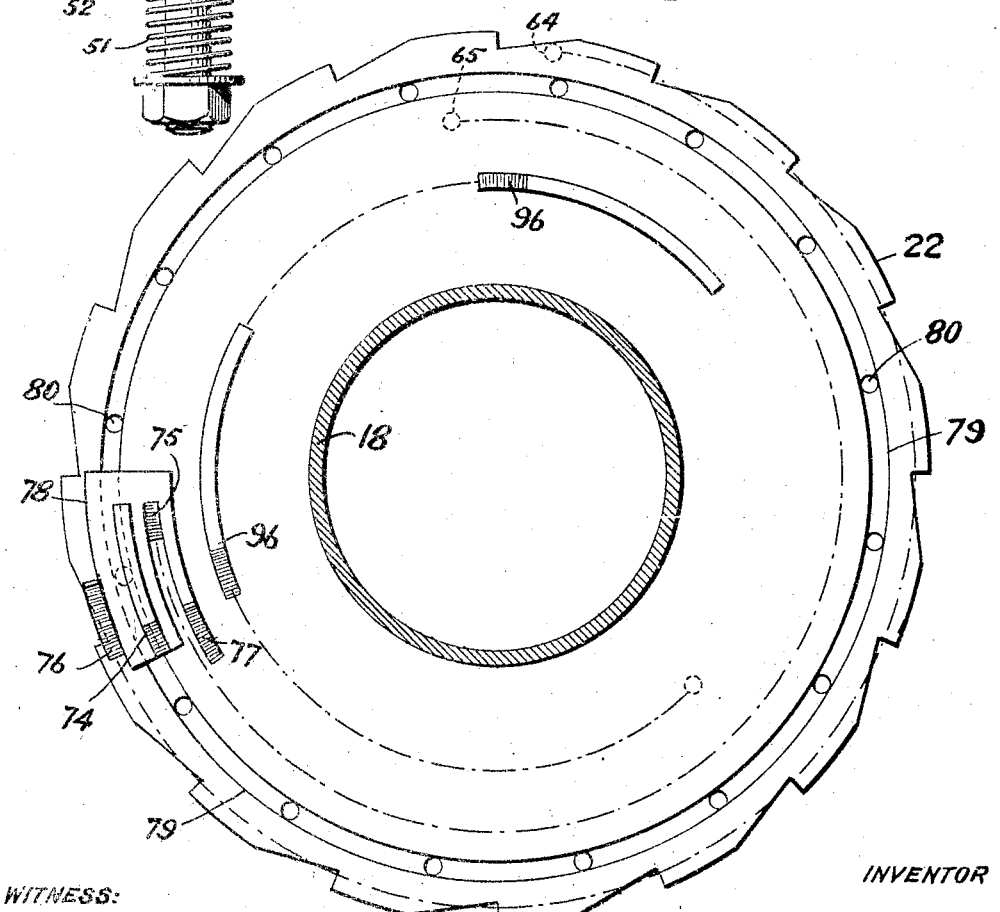

In the drawings, which show a preferred embodiment of my invention Figure 1 is a side elevation of the machine, partly broken away. Fig. 2 is a sectional plan view on line 2—2 of Fig. 3. Fig. 3 is a partial front view of the machine, with parts broken away. Fig. 4 is a vertical sectional view on line 4—4 of Fig. 2. Fig. 5 is a partial plan sectional view, similar to Fig. 2, but with parts omitted for clearness. Fig. 6 is a detail vertical sectional view of the knitting head. Fig. 7 is a perspective view of one of the yarn carrier cam plates. Figs. 8 and 9 are cross sections on lines 8—8 and 9—9 of Fig. 6. Fig. 10 is a partial vertical section similar to Fig. 6, but looking in the opposite direction. Fig. 11 is a plan view of the top frame and parts carried thereby. Fig. 12 is a plan view of the cam disk.

$a$ is the frame of the machine and $b$ the bed plate for the needle cylinder, cam ring and appurtenant mechanism. The needle cylinder $c$ has secured to its lower end the driven gear $d$ (which is actuated as hereinafter described) resting directly upon the ring $e$ within the bed $b$. The rotatable needle cylinder $c$ is provided with vertical radial slots extending inward from its outer wall, the needles $f$, $g$ extending within these slots and being movable upward therein to render them inactive, as is well understood in the art. Supported on the top of the bed plate is the cam ring $h$ which carries the knitting cams for actuating the needles.

As is well understood, during the knitting of the leg of the stocking and during the knitting of that part of the stocking between the heel and toe (hereinafter called the foot), the needle cylinder is continuously rotating and all the needles are down and in action. During the knitting of the heel and toe, the needle cylinder is oscillated and the needles $g$ extending throughout one half the circumference of the needle bed (hereinafter referred to as the rear bank of needles) are initially thrown out of action. This is effected by providing the needles $g$ with long butts and causing a cam to be moved into position to engage all the long butt needles and move them up out of action. During the oscillation of the needle cylinder, the needles $f$ extending throughout the remaining semi-circumference of the needle bed (*i. e.* the front bank of needles) are thrown out of action one at a time, first at one end of the semi-circumference and then at the other end, and so on alternately until only a limited number of needles in the central part of the front bank is in action. The needles are then thrown back again into action one at a time in the reverse order in which they are thrown out. This operation is effected by means of two sets of pickers having, preferably, the construction and operation of the picker forming the subject matter of the application of Harry A. Houseman, filed Sept. 14, 1915, Serial No. 50,555 and controlled by special mechanism.

Motion is imparted to the needle cylinder as follows: (see particularly Figs. 2 and 3): Gear $d$ is driven through idler $i$ from gear $j$ on clutch shaft $k$, on which are slidably mounted the two pinions $m$ and $n$, which have sleeves to which are yoked the vertically movable arms of a frame $o$, which is actuated as hereinafter described. The clutch member $p$ is fixed on shaft $k$ between pinions $m$ and $n$. The upper pinion $m$ is constantly rotated and the lower pinion $n$ is constantly oscillated. When the frame $o$ is moved down, thus engaging the rotary pinion $m$ with clutch member $p$ and disengaging the oscillatory pinion $n$ therefrom, gear $j$ is constantly rotated, thus rotating the needle cylinder. When the frame $o$ is elevated, thus disengaging the rotary pinion $m$ from clutch member $p$ and engaging the oscillatory pinion $n$ therewith, gear $j$ is constantly oscillated, thus oscillating the needle cylinder.

Pinion $m$ is constantly rotated by being continually in mesh with a spur gear $q$, turning on a vertical shaft $r$ and having attached to it a bevel gear $s$ which is driven by a bevel pinion $t$ on driving shaft $u$. Pinion $n$ is constantly oscillated by the following means: Attached to the lower end of shaft $r$ is a crank $v$, connected by a link $w$ with an arm of a quadrant $x$, which is mounted upon a post $y$ and is constantly engaging pinion $n$. The lowering and elevating of frame $o$, which dictates the change from oscillation to rotation and vice versa, is accomplished as follows: Mounted on the lower extension of the bed plate $b$, and concentrically beneath the needle cylinder, is the sleeve 18 provided with the flange 19. Secured to the periphery of this flange are cams 20, with beveled ends, as shown in Fig. 3, forming a cam path therebetween. Adjustably mounted on frame $o$ is a shoe 21, which projects within said cam path, and is lowered and raised by riding along the beveled ends of cams 20 during the rotation of sleeve 18. Thus, when shoe 21 is riding under the upper cams, rotating pinion $m$ is in engagement with clutch member $p$ and the needle cylinder is rotated; and when shoe 21 is riding over the lower cams, oscillating pinion $n$ is in engagement with clutch member $p$ and the needle cylinder is oscillated.

Sleeve 18 is given a step by step rotary motion dictated by a pattern chain and is actuated as follows: The sleeve carries a disk 22, hereinafter called the cam disk, (shown in detail in Fig. 12), with ratchet teeth on its outer circumference. The teeth may be of any convenient number, depending upon the possible number of changes of yarn and of shape required in knitting a stocking. Ordinarily, sixteen teeth give ample scope for variety in this regard. The cam disk is actuated directly by a spring pressed pawl 23 mounted on a slide 24, one end of which passes through a bearing in frame $a$ and the other end of which is pivotally connected with a lever 25. Lever 25 is mounted on a vertical axis between its ends and projects through the frame of the machine to connect with slide 24. On its opposite end it carries a roller 26, in line to be acted upon by a cam 27 secured to the under side of the constantly driven gear $q$. Spring 28 tends to hold roller 26 constantly against said cam. A bell crank lever 29 (see Fig. 1) is mounted upon frame $a$ and held by a spring 30 in a position with one of its ends in line to be acted upon by the lugs on a pattern chain 31, whose driving connection will be hereinafter described. The other end of lever 29 carries a toe 32 in position to act upon a lug 33 attached to slide 24, to hold said slide and pawl 23 carried thereby in their forward position, and to hold roller 26 from being acted upon by its cam 27.

The pattern chain 31 is given a constant step by step motion as follows (see Figs. 1, 3, 4 and 5): Mounted on post $y$ and connected with the hub of the constantly oscillatory quadrant $x$ is a section of a bevel gear 36. Sleeved upon shaft 37, which carries driving sprocket 38 of the pattern chain, is an arm 39 carrying a rack, or a portion of a bevel gear, which is in mesh with bevel gear section 36. Arm 39 carries a pawl 40 suitably mounted to act upon a ratchet wheel 41 fixed on shaft 37. Thus, the pattern chain is advanced one step at every oscillation of quadrant $x$ and therefore, at every revolution of gear $q$ and cam 27 carried thereby. When, therefore, in the actuation of ratchet 41, the pattern chain is advanced to a position to cause a lug thereon to actuate lever 29, toe 32 is moved out of engagement with lug 33, slide 24 is unlocked, spring 28 is free to move lever 25 to retract slide 24 as soon as roller 26 reaches the low point of cam 27, and pawl 23 drops back of the next tooth on cam disk 22; and as roller 26 rides onto the high point of cam 27, lever 25, slide 24 and pawl 23 are returned to the position shown in Figs. 1 and 3, thus advancing cam disk 22. When ratchet 41 is given its next impulse, roller 26 is still on the high point of cam 27, so that lug 33 is in position to permit toe 32 to snap back of it and lock slide 24 from being again retracted by spring 28 when roller 26 reaches the end of the high point of cam 27. Thus, each lug on the pattern chain effects the ratcheting forward of cam disk 22 a distance of one tooth and only one tooth and holds same in its advanced position.

In the manufacture of hosiery, yarns of different color and material are employed, for the use of which a plurality of yarn carriers 45 are provided and through which the various yarns z are led from their cops 46 to the needles. These yarn carriers, four of which are shown but which may be of any desired number, are pivotally mounted and are adapted to be normally held in an inactive position, with their threaded ends raised above the line of needles g, and to be lowered into active position as desired, by means, to be now briefly described, forming the subject of a separate patent issued to Harold E. Houseman November 24, 1915, No. 1,161,677.

Mounted on the bed plate at the rear of the knitting head (see Figs. 1, 3, 6, 11 and 12) is a stand 48, to which is pivoted, on a stud 49, the top frame 50. A coiled spring 51, between a nut on the end of stud 49 and a friction disk 52, presses the latter against the hub of frame 50 with sufficient friction to overcome the weight of the frame, so that same may be conveniently raised by hand and will remain raised in any angular position. When down in active position over the top of the needle cylinder, top frame 50 is secured by a spring catch 53 engaging with a pin 54 on a stand 55 mounted on the bed plate in front of the knitting head. A bracket 56 is mounted on the top frame and carries eyes through which the yarns z pass and are directed to the thread carriers 45, which also are mounted on top frame 50. The hubs of thread carriers 45 are toothed and engage with similarly toothed levers 57, which are also pivoted on frame 50. A detent lever 58 engages notches in the hub of each yarn carrier and holds same in either its active or inactive position. The depending lower ends of levers 57 extend within the forked ends of vertical bars 59 having projection 60 normally resting upon one of a pair of guide pins 61 in stand 48.

As shown on Fig. 6 the bar 59 therein shown is swung slightly to the right of its median position, thereby having caused its lever 57 to move its yarn carrier 45 down into active position as shown. It is clear that if this bar 59 is swung in the opposite direction, it will cause its lever 57 to elevate its yarn carrier out of action. To so swing bars 59, two exactly similar bell crank levers 62 are pivoted on stand 48 and similarly arranged on opposite sides of bars 59. Each bar 59 has a projection 63 on each side, so arranged that when the bar is in the position shown in Fig. 6, resting upon pin 61, the projection 63 on one side of the bar 59 is in line with the prolonged end of one of the bell crank levers 62, while the projection 63 on the opposite sides of the bar 59 is just below the line of action of the similar end of the other bell crank lever 62.

The bell crank levers are respectively operated by vertical rods 64, 65 actuated by cams to be hereinafter described. When so operated they will actuate such of the bars 59 whose projections 63 are in line of action of the prolonged ends of the bell cranks. That is, as shown, bar 59 is in position to be actuated by the projection 63 on the right, whereas if the bar were raised and also tilted to the left of its median position, the projection 63 on the left would be in position to be acted on by its lever 62. Each bar 59 has at its lower end a toe by which it may be thus raised by a suitable cam, with the result that those yarn carriers will be thrown out of action whose bars 59 rest upon pin 61, and those yarn carriers will be thrown into active position whose bars 59 are raised by such a cam. The toes of bars 59 are arranged out of line of one another, so that a cam may be arranged to act upon one bar without affecting the others.

Within top frame 50, and supported therefrom (see Figs. 1 and 11), is a yarn guiding plate 66 which, although of peculiar shape, performs in general the well known function of guiding any thread that has been moved by its carrier out of operative relation to the needles, into operative relation with a cutter 68 and a clamp 67, which respectively cut the thread and hold the end leading from the carrier clamped for further use. This cutter and clamp are not new in the art and need not be described herein further than to say that they are spring actuated to close and are opened by means of the common lever 69 passing beneath an adjusting screw 70 connected with the clamp and the upper member 71 of the cutter to raise them when said lever is raised. Lever 69 is fulcrumed on the top frame and has a depending arm which is actuated by one end of a spring pressed lever 72, also fulcrumed on the top frame. The other end of lever 72, when top frame 50 is in operative position, rests upon a vertical rod 73, which is slidably carried in stand 48 and extends downward through bed plate b, resting finally upon cam disk 22, in a position to be raised by a cam mounted on said disk. It will be understood, therefore, that the lifting of rod 73 by a cam on the cam disk opens the clamp and cutter and the dropping of the rod causes the thread to be cut and clamped.

The sequence of operation of the parts just described is as follows: Assuming that a change of yarn is desired, first a cam 74 on disk 22 is arranged to raise the bar 59 operating the desired yarn carrier 45 into operative position to be acted upon by the left hand lever 62, Fig. 6. Next, a cam 75 on disk 22 is arranged to raise rod 65, actuating said lever 62 to cause said bar 59, which has been raised, to cause the corresponding yarn carrier 45 to move down into operative position. Next, a cam 76 is arranged to raise rod 64, which actuates the bar or bars 59 that are in the lower position shown in Fig. 6, to cause the corresponding carrier or carriers to be moved up out of operative position. These successive, instead of simultaneous, movements, of the two levers 62 are preferred, to insure the placing of the new yarn in the needles before the old yarn is removed therefrom. Finally, a cam 77 is arranged to raise rod 73, which operates the cutter and clamp through levers 72 and 69. As this sequence is to be followed at each change of yarn cams 74, 75, 76 and 77 are arranged on a single cam piece 78 (see Fig. 7) which is mounted upon cam disk 22. To facilitate the correct positioning of said cam pieces upon the cam disk, a groove 79 is turned in the face of the disk and the cam pieces are provided with corresponding tongues. Equally spaced holes 80 are drilled in the base of this groove, there being one hole to each ratchet tooth. These holes coact with a depending stud on the under side of each cam piece to correctly locate the cams.

Should it be desired to introduce more than one thread at the same time into the fabric of the stocking, it will be understood that a cam 74 is provided for each of such threads; cam piece 78 affording space for four such cams, any one or more of which are provided according to the combination of threads desired. Cam pieces 78 may be thus built up and kept in stock as units, which may readily be mounted on the cam disk 22, in correct positions relatively to each other, to effect any desired change of yarn whenever, and as often as, called for.

It is frequently desired, at the change from oscillation to rotation at the beginning of the knitting of that portion of the stocking between the heel and toe, to insert a reinforcing thread z' (see Fig. 10). For this purpose an auxiliary yarn carrier 145 is pivotally mounted on top frame 50 beside carriers 45. This carrier 145 is moved into operative position by a spring 146 and is rendered inoperative by the action of an arm 147, moved in turn by a lever 149, which is continually pressed upon by an arm of lever 150 under the action of a spring 151. When top 50 is raised, carrier 145 is lifted away from the underlying arm 147 and a stop 144 is provided as an abutment for the carrier. Spring 151 is of more strength than spring 146 and therefore when top frame 50 is lowered, the auxiliary yarn carrier is normally held in its upper, inactive position.

In order to render carrier 145 active, lever 150 is retracted from lever 149 by means of an intermediate lever 152 and a rod 153, the latter being vertically slidable in stand 48 and normally with its lower end resting upon cam disk 22. When it is desired to insert the reinforcing yarn, a cam 154 is provided on the cam disk, which cam underrides and elevates rod 153, thereby turning arm 152 and tipping lever 150, as shown in Fig. 10, which allows spring 146 to depress carrier 145 into action.

As it is often desirable to insert the reinforcing yarn in the under half of the foot portion of the stocking only, it is necessary to free it from the needles during half of each rotation of the needle cylinder. For this purpose a semicircular cam 155 is mounted on the cylinder, concentric therewith, and in line with a roller upon lever 149, this cam being of such a diameter that for its semicircular length it will act upon said roller to press out lever 149 and render carrier 145 inactive. Thus, in the rotation of the cylinder, when cam 154 on the cam disk is inactive, the auxiliary carrier will spring into and out of action every revolution, laying the reinforcing yarn in the needles which knit the lower half of the foot and allowing it to hang idle during the other half. In finishing, the loose hanging portions of the yarn subtending the unknitted half are removed. I have not herein particularly described certain other mechanism necessary for the automatic production of an entire stocking. Thus, I have not described the means for raising and lowering the needle cylinder to vary the tension of the needles, as, for example, when a reinforcing yarn is inserted, at which time the needle cylinder is raised. Nor have I described the means for throwing out of action the rear bank of needles preparatory to knitting the heel and toe; nor the narrowing pickers and widening pickers and their actuating mechanism, which, as is well known, operate during the knitting of the heel and toe; nor the means for withdrawing the knitting cams, leveling the needles and stopping the machine. Some of these operations coincide with certain changes of yarn and may be said to be related to the mechanism hereinbefore particularly described; but a description of their specific construction and operation— which may be widely varied—is unnecessary to an understanding of the subject-matter of the present invention.

Having now fully described my invention, what I claim and desire to protect by Letters Patent is:

1. In a circular knitting machine, in combination, a needle cylinder, yarn carriers, mechanism adapted to be first positioned and then operated to change the carriers, a cam disk turning on a vertical axis, yarn carrier positioning cams and yarn carrier changing cams on the disk adapted to operate said mechanism, a pattern chain, and means controlled by the pattern chain to turn the cam disk step by step.

2. In a circular knitting machine, in combination, yarn carriers, mechanism adapted to be first positioned and then operated to change the carriers, clamping and cutting mechanism, a rotatable cam carrier, yarn carrier positioning and yarn carrier changing cams, a cam adapted to control the clamping and cutting mechanism, a unitary cam block carrying said cams and detachably secured to the cam carrier, and pattern mechanism dictating the intermittent turning of the cam carrier.

3. In a circular knitting machine, in combination, a needle cylinder and knitting mechanism adapted to knit a complete stocking, yarn carriers, mechanism to control the movement of the yarn carriers into and out of action, clamping and cutting mechanism, a rotatable cam carrier, a pattern device, means controlled by the pattern device to turn the cam carrier step by step at intervals and impart to it one complete rotation during the knitting of a single stocking, and a plurality of cam-carrying blocks each adapted to control both the yarn changing mechanism and the clamping and cutting mechanism to effect both a change of yarn and the cutting and clamping of the yarn rendered inactive, each of said cam blocks being detachably securable to the cam carrier at any one of a number of different radial points and extending along a relatively small arc of the cam carrier, thus enabling a number of blocks to be arbitrarily positioned on the cam carrier at different radii thereof, whereby each of said blocks dictates both any desired change of yarn and the operation of the clamping and cutting mechanism at any selected stage in the knitting of a single stocking.

4. In a circular knitting machine, in combination, a needle cylinder, yarn carriers, mechanism adapted to effect any predetermined change of carriers, said mechanism including means, independent of the cams hereinafter mentioned, to maintain the several yarn carriers in the respective positions to which they have been operated, sets of cams, each set adapted to control the operation of said mechanism to effect a change of yarn carriers, a rotatable cam carrier, and a plurality of independent cam blocks each carrying a set of cams, said blocks being detachably securable to the cam carrier at any one of a number of different radial points, whereby the provision of means to maintain the yarn carriers in the position to which they are shifted permits the employment of cam blocks carrying cams of minimum number and length.

5. In a circular knitting machine, in combination, a needle cylinder, yarn carriers, mechanism adapted to effect any predetermined change of carriers, said mechanism including means, independent of the cams hereinafter mentioned, to maintain the several yarn carriers in the respective positions to which they have been operated, clamping and cutting mechanism, sets of cams, each set adapted to control the operation of said mechanism to effect a change of yarn carriers and the cutting and clamping of the yarn rendered inactive, a rotatable cam carrier, and a plurality of independent cam blocks each carrying one of said sets of cams, said blocks being detachably securable to the cam carrier at any one of a number of different radial points.

6. In a circular knitting machine, in combination, a needle cylinder, the regular yarn carriers, an auxiliary yarn carrier, a spring tending to hold the auxiliary carrier in active position, a carrier-actuating arm, a tension device tending to actuate the arm and overcome the tension of said spring and thereby hold the auxiliary carrier in inactive position, and pattern-controlled means to render the tension device inoperative to so operate the arm.

7. In a circular knitting machine, in combination, a needle cylinder, the regular yarn carriers, an auxiliary yarn carrier, a spring tending to hold the auxiliary carrier in active position, a carrier actuating arm, a tension device tending to actuate the arm and overcome the tension of said spring and thereby hold the auxiliary carrier in inactive position, a cam disk, means to turn the disk step by step, a cam on the disk, and means operated thereby to render the tension device inoperative to actuate the arm.

8. In a circular knitting machine, in combination, the main frame, a needle cylinder, a yarn carrier, a movable top frame to which the carrier is pivoted, a spring tending to hold the carrier in active position when the top frame is swung into operative relation with the needle cylinder, an arm pivoted on the main frame and engaging said carrier when the top frame is in the stated position, a tension device adapted to actuate the arm, when the top frame is in the position specified, and overcome the tension of said spring and thereby hold the carrier in inactive position in opposition to said spring, and pattern-controlled means to render the tension device inoperative to so operate the arm.

9. In a circular knitting machine, in combination, a needle cylinder, a pivoted yarn carrier, a spring tending to hold the carrier in active position, a movable arm adapted to hold the carrier in inactive position, a lever adapted to so hold the arm, a tension device adapted to so hold the lever, and pattern-controlled means to render the tension device inoperative and thereby permit the carrier to be operated by said spring.

10. In a circular knitting machine, in combination, a needle cylinder, a yarn carrier, a spring tending to hold the carrier in active position, a movable arm adapted to hold the carrier in inactive position, a lever adapted to so hold the arm, a second lever adapted to so hold the first lever, a second spring adapted to so hold the second lever, and pattern-controlled means to hold the second lever from operation by its spring, thereby permitting the first spring to actuate the carrier.

11. In a circular knitting machine, in combination, a needle cylinder, a yarn carrier, a spring tending to hold the carrier in active position, a movable arm adapted to hold the carrier in inactive position, a lever adapted to so hold the arm, a second lever adapted to so hold the first lever, a second spring adapted to so hold the second lever, a third lever to hold the second lever from operation by its spring, and pattern-governed means controlling the operation of the third lever.

12. In a circular knitting machine, in combination, a rotatable needle cylinder, a yarn carrier, a spring tending to hold the carrier in active position, a cam turning with the needle cylinder, a lever connected with the carrier and engaging said cam and adapted to be operated thereby to render the yarn carrier inactive during a part of each rotation of the needle cylinder, a tension device tending to hold the lever in position to render the yarn carrier continuously inactive, and pattern-controlled means to render the tension device inoperative.

13. In a circular knitting machine, in combination, a rotatable needle cylinder, a yarn carrier, a spring tending to hold the carrier in active position, a cam turning with the needle cylinder, a lever connected with the carrier and engaging said cam and adapted to be operated thereby to render the yarn carrier inactive during a part of each rotation of the needle cylinder, a second spring, a second lever operated by the latter spring and tending to hold the first lever in position to render the yarn carrier continuously inactive, and pattern controlled means to move the second lever, in opposition to its spring, into inoperative position.

14. In a circular knitting machine, in combination, a rotatable needle cylinder, a yarn carrier, a spring tending to hold the carrier in active position, a cam turning with the needle cylinder, a lever connected with the carrier and engaging said cam and adapted to be operated thereby to render the yarn carrier inactive during a part of each rotation of the needle cylinder, a second spring, a second lever operated by the latter spring and tending to hold the first lever in position to render the yarn carrier continuously inactive, a third lever adapted to move the second lever, in opposition to its spring, into inoperative position, and pattern-controlled means to so move the third lever.

15. In a circular knitting machine, in combination, a rotatable needle cylinder, a yarn carrier, a spring tending to hold the carrier in active position, a movable arm, a cam turning with the needle cylinder, a lever engaging said cam and adapted to be operated thereby to move said arm and thereby render the yarn carrier inactive during a part of each rotation of the needle cylinder, a tension device tending to hold the lever in position to continuously so hold the arm, and pattern-controlled means to render the tension device inoperative.

16. In a circular knitting machine, in combination, a rotatable needle cylinder, a yarn carrier, a spring tending to hold the carrier in active position, a movable arm, a cam turning with the needle cylinder, a lever engaging said cam and adapted to be operated thereby to move said arm and thereby render the yarn carrier inactive during a part of each rotation of the needle cylinder, a second spring, a second lever operated by the latter spring and tending to hold the first lever in position to continuously so hold the arm, and pattern controlled means to move the second lever, in opposition to its spring, into inoperative position.

17. In a circular knitting machine, in combination, a rotatable needle cylinder, a yarn carrier, a spring tending to hold the carrier in active position, a movable arm, a cam turning with the needle cylinder, a lever engaging said cam and adapted to be operated thereby to move said arm and thereby render the yarn carrier inactive during a part of each rotation of the needle cylinder, a second spring, a second lever operated by the latter spring and tending to hold the first lever in position to continuously so hold the arm, a third lever adapted to move the second lever, in opposition to its spring, into inoperative position, and pattern controlled means to so move the third lever.

18. In a circular knitting machine, in combination, a needle cylinder, a yarn carrier, a spring tending to hold the carrier in active position, a cam turning with the needle cylinder, cam-actuated mechanism adapted to render the yarn carrier inoperative during a part of each rotation of the needle cylinder, spring actuated mechanism tending to hold the cam-actuated mechanism in position to render the yarn carrier continuously inoperative, and pattern controlled means to render the spring-actuated mechanism inoperative.

19. In a circular knitting machine, in combination, a needle cylinder, a yarn carrier, a spring tending to hold the carrier in active position, a cam turning with the needle cylinder, cam actuated mechanism adapted to render the yarn carrier inoperative during a part of each rotation of the needle cylinder, spring actuated mechanism tending to hold the cam-actuated mechanism in position to render the yarn carrier continuously inoperative, a cam disk, pattern controlled means to turn the same step by step, a cam thereon, and means actuated thereby to render the spring-actuated mechanism inoperative.

20. In a circular knitting machine, in combination, a needle cylinder, a yarn carrier, a spring tending to hold the carrier in active position, a cam turning with the needle cylinder, cam-actuated mechanism adapted to render the yarn carrier inoperative during a part of each rotation of the needle cylinder, spring actuated mechanism tending to hold the cam-actuated mechanism in position to render the yarn carrier continuously inoperative, a cam disk, pattern controlled means to turn the same step by step, a cam on the disk, and a vertically movable rod adapted to be raised by the cam and engage the spring-actuated mechanism and move and hold it out of operative position.

21. In a circular knitting machine, in combination, a needle cylinder, a yarn carrier, a cam turning with the needle cylinder, a pivoted lever, a pivoted arm between and engaging the yarn carrier and lever, a spring tending to hold the yarn carrier in active position and the arm and lever in position to enable the cam to actuate the lever, a second spring, a second lever, actuated thereby, engaging the first lever and when so actuated holding it and the arm in position to render the yarn carrier continuously inoperative, a cam disk, means to turn the same step by step, a cam on the disk, and means actuated by the cam to move the second lever, against the tension of its spring, out of operative relation with the first lever.

In testimony of which invention, I have hereunto set my hand, at Philadelphia, on this 14th day of February, 1916.

HARRY A. HOUSEMAN.